United States Patent
Niihara (10) Patent No.: US 12,285,974 B1
(45) Date of Patent: Apr. 29, 2025

(54) WHEEL UNIT AND WHEEL-TYPE MOBILE BODY

(71) Applicant: KYUPLA Co., Ltd., Kagoshima (JP)

(72) Inventor: Toshiro Niihara, Kagoshima (JP)

(73) Assignee: KYUPLA Co., Ltd., Kagoshima (JP)

( * ) Notice: Subject to any disclaimer, the term of this patent is extended or adjusted under 35 U.S.C. 154(b) by 0 days.

(21) Appl. No.: 19/014,167

(22) Filed: Jan. 8, 2025

(30) Foreign Application Priority Data

Mar. 4, 2024 (JP) .................................. 2024-032581

(51) Int. Cl.
*B60B 33/00* (2006.01)

(52) U.S. Cl.
CPC ...... *B60B 33/0092* (2013.01); *B60B 33/0042* (2013.01); *B60B 33/0049* (2013.01); *B60B 33/0057* (2013.01); *B60B 33/0068* (2013.01); *B60B 33/0073* (2013.01)

(58) Field of Classification Search
CPC ............ B60B 33/0028; B60B 33/0055; B60B 33/0094; B60B 33/0039; B60B 33/0049; B60B 33/0057; B60B 33/0068; B60B 33/0081; B60B 33/0084; B60B 33/0092; B60B 33/025; B60B 33/021; B60B 33/023; B60B 33/0042; B60B 33/0073; B60B 33/0078; B60B 33/0086; B60B 37/10; B60B 2200/222; B60B 2200/24; B60B 2200/242; B60B 2900/531; F16D 49/00; F16D 65/42; F16D 2121/14; F16D 2125/32

See application file for complete search history.

(56) References Cited

U.S. PATENT DOCUMENTS

| | | | |
|---|---|---|---|
| 7,712,184 B1 * | 5/2010 | Lewis ................ | B60B 33/0049 16/35 R |
| 2022/0154787 A1 * | 5/2022 | Frank ...................... | F16D 49/00 |
| 2023/0038537 A1 * | 2/2023 | Baker, Jr. ............ | B60B 33/0092 |
| 2023/0277397 A1 * | 9/2023 | Monson .................. | A61G 7/08 180/6.2 |

FOREIGN PATENT DOCUMENTS

| | | | |
|---|---|---|---|
| CN | 211730929 U | * | 10/2020 |
| JP | S61-3307 U | | 1/1986 |
| JP | H07-284430 A | | 10/1995 |
| JP | H08-316020 A | | 11/1996 |
| JP | 2001058503 A | * | 3/2001 |
| JP | 2008137630 A | * | 6/2008 |
| JP | 2008-168741 A | | 7/2008 |
| JP | 2014-521557 A | | 8/2014 |

* cited by examiner

*Primary Examiner* — Chuck Y Mah (74) *Attorney, Agent, or Firm* — Muncy, Geissler, Olds & Lowe, P.C.

(57) ABSTRACT

A wheel unit 1 is composed of a stopper portion 70 installed in a main body portion 20 and a stopped portion 14 installed in a wheel and tire assembly portion 10. The stopper portion 70 is an electromagnet. When a voltage is applied to the stopper portion 70 at the time of turning a power source on with an electrode terminal portion 50 nested in a main shaft portion 40 as a contact, the electromagnet generates a magnetic field and is magnetically attached to the stopped portion 14 formed of a metal piece, whereby the rotation of the wheel and tire assembly portion 10 can be restricted.

6 Claims, 6 Drawing Sheets

WHEEL UNIT AND WHEEL-TYPE MOBILE BODY

TECHNICAL FIELD

The present invention relates to a wheel unit and a wheel-type mobile body. Specifically, the present invention relates to a wheel unit and a wheel-type mobile body that can reliably lock a wheel by a simple operation and prevent unintended movement of the mobile body.

DESCRIPTION OF THE RELATED ART

For example, mobile bodies that have wheels and are transported along a floor surface, such as stretchers, nursing beds, and baby carriages are widely used. Various wheel units including a wheel locking mechanism for preventing the mobile bodies from unintentionally moving have been proposed.

For example, Patent Document 1 discloses a mechanism in which a gear-shaped portion is provided on a wheel, a pedal is rotatably provided substantially above a wheel cover, a user operates the pedal with a foot to rotate the pedal, and a locking member connected to the pedal is fitted into and locked to a recess of the gear-shaped portion of the wheel, thereby locking the wheel.

PRIOR ART DOCUMENT

Patent Document

[Patent Document 1] Japanese Unexamined Patent Application Publication No. H07-284430

SUMMARY OF THE INVENTION

Problem to be Solved by the Invention

The wheel unit disclosed in Patent Document 1 is a mechanism in which the user operates the pedal with a foot to lock and unlock the wheel. However, a predetermined force is required for the pedal operation, and for women or elderly people having a weak pedal stepping force or users unfamiliar with the pedal operation, it may take time to lock the wheel. Further, if the pedal stepping force is weak, the wheel is locked in an incomplete state, which causes a problem that the mobile body unintentionally starts to move.

The present invention has been made in view of the foregoing point, and an object thereof is to provide a wheel unit and a wheel-type mobile body that can reliably lock a wheel by a simple operation and prevent unintentional movement of the mobile body.

Means for Solving the Problem

In order to achieve the foregoing object, a wheel unit of the present invention includes a main body portion, a main shaft portion having a coupling portion capable of being coupled to an attached body and supported by the main body portion, an electrode terminal portion formed of a conductive member and including a first terminal portion composed of a first electrode and a second terminal portion composed of a second electrode, a stopper portion connected to the electrode terminal portion via a lead wire and generating a magnetic force by energization, and a wheel and tire assembly portion having a wheel portion supported by the main body portion via an axle portion so as to be rotatable around a horizontal axis, a tire portion attached to an outer circumference of the wheel portion, and a stopped portion arranged facing the stopper portion and against or with which the stopper portion abuts or is engaged when energized to restrict rotation of the wheel portion.

Here, the wheel unit includes the main body portion, so that each component including the main shaft portion described later is attached to the main body portion, thereby allowing them to be integrated as the wheel unit.

Further, by providing the main shaft portion having the coupling portion capable of being coupled to the attached body and supported by the main body portion, the wheel unit can be coupled to the attached body by the main shaft portion.

Further, by providing the electrode terminal portion formed of the conductive member and including the first terminal portion composed of the first electrode and the second terminal portion composed of the second electrode, electricity supplied from a power source is supplied to the stopper portion described later via the electrode terminal portion by connecting the power source and the electrode terminal portion, and the stopper portion can be activated.

Further, by providing the stopper portion connected to the electrode terminal portion via the lead wire and generating a magnetic force by energization, electromagnetically activated and inactivated states of the stopper portion can be switched by turning the power source on and off.

Further, by providing the wheel and tire assembly portion having the wheel portion supported by the main body portion via the axle portion so as to be rotatable around the horizontal axis, the tire portion attached to the outer circumference of the wheel portion, and the stopped portion arranged facing the stopper portion and against or with which the stopper portion abuts or is engaged when energized to restrict the rotation of the wheel portion, the stopper portion abuts against or is engaged with the stopped portion arranged facing thereto when the stopper portion is electromagnetically activated, thereby allowing the wheel and tire assembly portion to be reliably locked with a simple configuration.

As described above, by attaching the wheel unit to the mobile body (the stretcher, the nursing bed, the baby carriage, or the like) which is the attached body, the lock of the wheel and tire assembly portion is released when the stopper portion is in the inactivated state, so that the mobile body can be easily moved. Further, by electromagnetically activating the stopper portion, the stopper portion abuts against or is engaged with the stopped portion, whereby the wheel and tire assembly portion is brought into the locked state, and the mobile body can be prevented from unintentionally starting to move.

When the main shaft portion has a cylindrical shape supported so as to be rotatable around a vertical axis with respect to the main body portion, the main shaft portion rotates with the wheel unit attached to the attached body. Thus, the direction of the attached body can be easily changed.

When the first terminal portion and the second terminal portion are rod-shaped bodies extending from a proximal end to a distal end, the first terminal portion and the second terminal portion are nested in the main shaft portion, and the main shaft portion, the first terminal portion, and the second terminal portion are connected so as to be integrally rotatable with a common rotation axis, the main shaft portion and the electrode terminal portion can be arranged in a limited space and an increase in size of the wheel unit can be prevented.

When the second terminal portion is nested in the first terminal portion so that a predetermined length of the rod-shaped body is exposed from a proximal end, the first electrode portion and the second electrode portion can be arranged in a limited space and an increase in size of the wheel unit can be prevented.

When the first terminal portion has a first current-carrying portion to which the lead wire is connected, a first elongated protrusion radially protruding at a predetermined axial position, and a first contact portion composed of an elastic material and connecting the first current-carrying portion and the first elongated protrusion, electricity input to the first terminal portion is input from the first contact portion to the stopper portion via the lead wire.

At this time, the first current-carrying portion to which the lead wire is connected has a ring shape and is loosely inserted around the first terminal portion, so that the first current-carrying portion to which the lead wire is connected does not rotate even if the main body of the first terminal portion rotates integrally with the main shaft portion. Therefore, the lead wire can be prevented from being wound around the main body of the first terminal portion or breaking.

When the second terminal portion has a second current-carrying portion to which the lead wire is connected, a second elongated protrusion radially protruding at a predetermined axial position, and a second contact portion composed of an elastic material and connecting the second current-carrying portion and the second elongated protrusion, electricity input to the second terminal portion is input from the second contact portion to the stopper portion via the lead wire.

Similarly to the first terminal portion, also in the second terminal portion, the second current-carrying portion to which the lead wire is connected has a ring shape and is loosely inserted around the second terminal portion, so that the second current-carrying portion to which the lead wire is connected does not rotate even if the main body of the second terminal portion rotates integrally with the main shaft portion. Therefore, the lead wire can be prevented from being wound around the main body of the second terminal portion or breaking.

When the stopper portion is an electromagnet and the stopped portion is a metal piece to which the electromagnet can be magnetically attached when energized, the stopper does not operate when not energized, and generates a magnetic force and is magnetically attached to the stopped portion only when energized, whereby the rotation of the wheel and tire assembly portion can be reliably restricted.

When the stopper portion is a solenoid having a movable iron core to which a rod is connected and the stopped portion is an engagement hole formed so that the rod protruding as the movable iron core moves when the solenoid is energized can be engaged therewith, the stopper portion does not operate when not energized, and the rod protrudes as the movable iron core moves only when energized, and the protruding rod is engaged with the engagement hole, which is the stopped portion, whereby the rotation of the wheel and tire assembly portion can be reliably restricted.

When the wheel and tire assembly portion has a pair of wheels rotatably supported at predetermined intervals at both ends of the main body portion, and the stopper portion and the stopped portion are installed on each of the pair of the wheels, the stopper portion and the stopped portion are arranged on each of the wheels, so that the rotation of the wheel and tire assembly portion can be reliably restricted even in the case of a twin wheel.

Advantageous Effects of the Invention

The wheel unit and the wheel-type mobile body according to the present invention can reliably lock the wheel by a simple operation and prevent unintended movement of the mobile body.

BRIEF DESCRIPTION OF THE DRAWINGS

FIG. 1(a) and FIG. 1(b) are views illustrating a wheel unit according to a first embodiment of the present invention, in which

FIG. 4(a) and FIG. 4(b) are views illustrating a wheel unit according to a second embodiment of the present invention, in which

MODES FOR CARRYING OUT THE INVENTION

Hereinafter, a wheel unit and a wheel-type mobile body according to embodiments of the present invention will be described with reference to the drawings for understanding of the present invention. In each of the figures, for the sake of explanation, a direction going upward is defined as an upward direction, a direction opposite to the upward direction is defined as a downward direction, an axial direction represented by the upward direction and the downward direction is defined as a vertical axis, and an axial direction perpendicular to the vertical axis is defined as a horizontal axis in a state where the wheel unit is installed on an installation surface.

1. First Embodiment

Figure 1A:
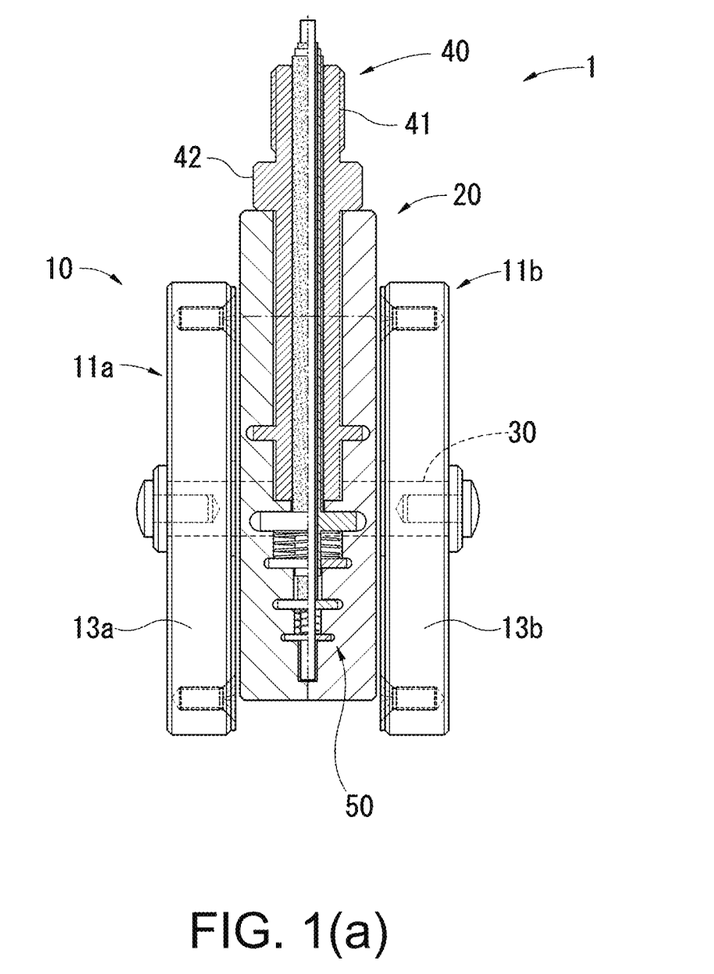
FIG. 1(a) is a front view and FIG. 1(b) is a perspective view.
Figure 1B:
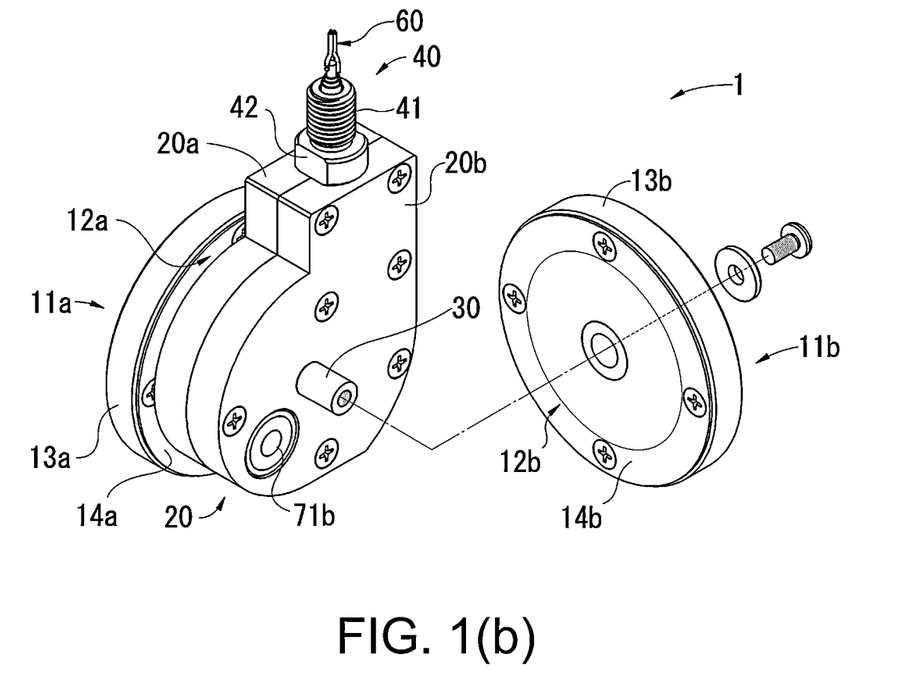
Figure 2:
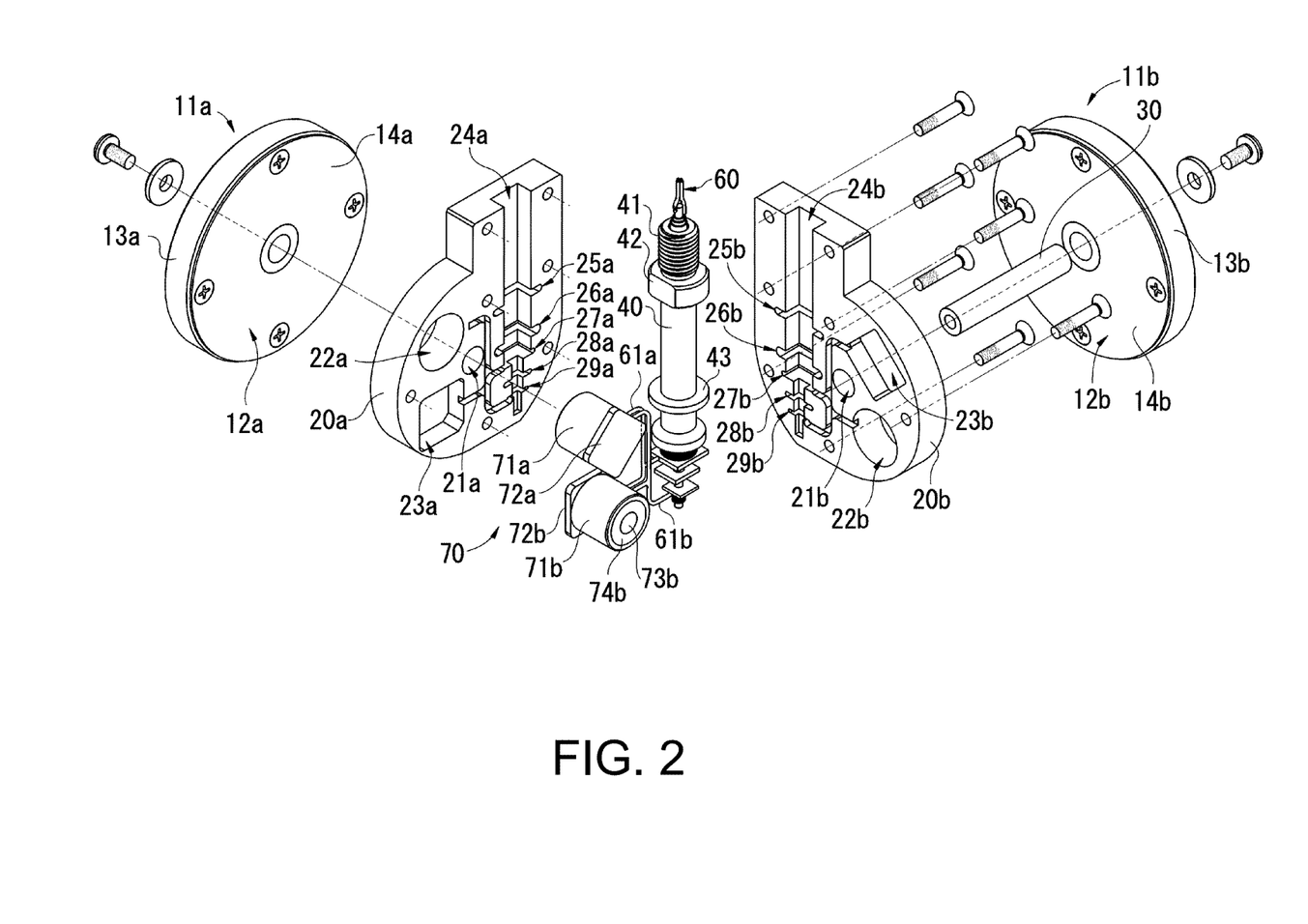
FIG. 2 is an exploded view of the wheel unit according to the first embodiment of the present invention.
Figure 3:
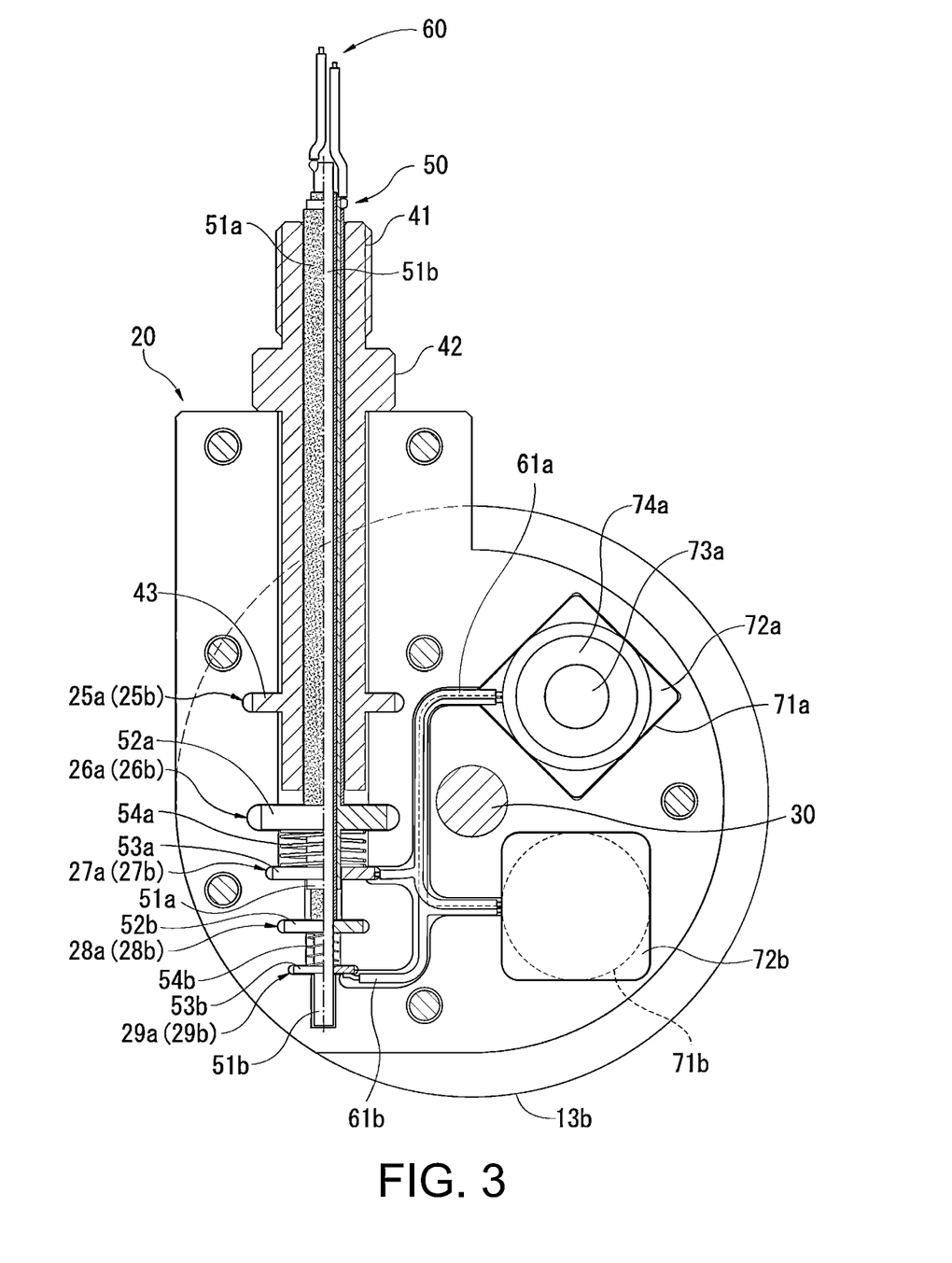
FIG. 3 is a side cross-sectional view of the wheel unit according to the first embodiment of the present invention.

FIG. 1 to FIG. 3 are views illustrating a wheel unit 1 according to a first embodiment of the present invention. As shown in FIG. 1, the wheel unit 1 is of a twin wheel type having a first wheel and tire assembly portion 11a and a second wheel and tire assembly portion 11b on the left and right sides when viewed from the front, and these wheel and tire assembly portions 10 are attached to the left and right sides of a main body portion 20 via a common axle portion 30.

[Main Body Portion]

As shown in FIG. 2, the main body portion 20 is composed of a pair of half components having a symmetrical shape, and axle portion holes 21a and 21b through which the axle portion 30 for attaching a wheel and tire assembly portion 10 passes are respectively formed at substantially center positions of a main body portion 20a and a main body portion 20b.

The main body portion 20a is formed with a fitting hole 22a into which a first electromagnet 71a, which is an electromagnet serving as a stopper portion 70 described later and abuts against the first wheel and tire assembly portion 11a to restrict the rotation of the first wheel and tire assembly portion 11a, is loosely fitted. The other main body portion 20b is formed with a substantially rectangular support groove 23b that can be loosely fitted around a substantially rectangular first base portion 72a attached to a proximal end of the first electromagnet 71a.

The main body portion 20b has a symmetrical shape to the main body portion 20a and is formed with a fitting hole 22b into which a second electromagnet 71b abutting against the second wheel and tire assembly portion 11b to restrict the rotation of the second wheel and tire assembly portion 11b is loosely fitted. The other main body portion 20a is formed with a substantially rectangular support groove 23a that can be loosely fitted around a substantially rectangular second base portion 72b attached to a proximal end of the second electromagnet 71b.

Here, the support grooves 23a and 23b do not necessarily have to be formed in a rectangular shape. However, by being formed in the rectangular shape, the support grooves 23a and 23b can restrict the movements of the first electromagnet 71a and the second electromagnet 71b in the rotation direction accompanied by the rotation of the wheel and tire assembly portion 10.

Elongated hole grooves 24a and 24b into which a main shaft portion 40 and an electrode terminal portion 50 described later can be fitted are formed in the height direction of the main body portions 20a and 20b, respectively. First fitting grooves 25a and 25b into which a flange portion 43 of the main shaft portion 40 described later is fitted are formed at predetermined positions in the length direction of the elongated hole grooves 24a and 24b so as to be orthogonal to the elongated hole grooves 24a and 24b.

Below the first fitting grooves 25a and 25b, second fitting grooves 26a and 26b and third fitting grooves 27a and 27b into which a first elongated protrusion 52a and a first current-carrying portion 53a of the first terminal portion 51a are respectively fitted are formed, and fourth fitting grooves 28a and 28b and fifth fitting grooves 29a and 29b into which a second elongated protrusion 52b and a second current-carrying portion 53b of the second terminal portion 51b are respectively fitted are formed.

[Main Shaft Portion]

The main shaft portion 40 has a coupling portion 41 that can be coupled to an attached portion of a stretcher, a nursing bed, a baby carriage, or the like (hereinafter, referred to as a "mobile body") to which the wheel unit 1 is attached at its distal end. A proximal end side opposite to the coupling portion 41 is formed of a substantially cylindrical body with an open end. The electrode terminal portion 50 described later is nested inside. The coupling portion 41 has a top portion formed with through holes through which lead wires 60 connected to a power source (not shown) can be inserted, and the lead wires 60 are inserted through the through holes and connected to the electrode terminal portion 50.

The coupling portion 41 has an outer circumferential surface formed with a male thread that can be screwed into a female thread, which is the attached portion (not shown) formed in the mobile body. The coupling portion 41 has a lower end attached with a nut 42 for fastening the coupling portion 41 in a state of being fitted to the female thread of the mobile body.

The main shaft portion 40 has a radially protruding flange portion 43 at a predetermined axial position thereof, and the flange portion 43 is fitted into the first fitting grooves 25a and 25b. The flange portion 43 does not necessarily have to be provided, but vertical movement of the main shaft portion 40 can be restricted by providing the flange portion 43. Therefore, the vertical vibrations at the time of moving the mobile body can be suppressed and the main shaft portion 40 can be prevented from falling off the main body portion 20.

The main shaft portion 40 configured as described above is sandwiched between the main body portions 20a and 20b so as to be rotatable around the axis and is fixed by screws (not numbered). As described above, the main shaft portion 40 is rotatably supported with respect to the main body portion 20, so that the mobile body to which the wheel unit 1 is attached can easily change its direction to a predetermined direction by rotating the main shaft portion 40.

[Electrode Terminal Portion]

The electrode terminal portion 50 functions as a contact for outputting electricity from the power source to the electromagnets, is composed of a first negative terminal portion 51a and a second positive terminal portion 51b, each of which is formed of a rod-shaped body of a conductive member extending from a proximal end to a distal end, and the second terminal portion 51b is formed to be longer than the first terminal portion 51a by a predetermined length.

The first terminal portion 51a has a tubular shape having an inner diameter formed to be larger than an outer diameter of the second terminal portion 51b by a predetermined amount. The second terminal portion 51b is nested by being stored in the first terminal portion 51a. In a state where height positions of distal end portions of the first terminal portion 51a and the second terminal portion 51b are aligned, the distal end portions are joined and integrated, and a part of the second terminal portion 51b is exposed to the outside from the proximal end side of the first terminal portion 51a toward the lower side.

The electrode terminal portion 50 configured as described above is nested in the main shaft portion 40 so that the main shaft portion 40 and the electrode terminal portion 50 are concentric in a plan view. The main shaft portion 40 and the electrode terminal portion 50 are integrated with their distal end portions aligned, so that the main shaft portion 40 and the electrode terminal portion 50 can rotate around the axis with the common rotation axis. The lead wires 60 extending from the power source are inserted through the through holes in the main shaft portion 40 and are respectively connected to the first terminal portion 51a and the second terminal portion 51b.

Here, the electrode terminal portion 50 does not necessarily have to be nested in the main shaft portion 40, and the main shaft portion 40 and the electrode terminal portion 50 do not necessarily have to be integrated. The main shaft portion 40 and the electrode terminal portion 50 may be arranged separate from each other. However, the main shaft portion 40 and the electrode terminal portion 50 can be efficiently arranged in the space-saving main body portion 20 by arranging the main shaft portion 40 and the electrode terminal portion 50 in a nested manner to be integrated.

The electrode terminal portion 50 is configured to be longer than the main shaft portion 40 by a predetermined length, and the second terminal portion 51b is configured to be longer than the first terminal portion 51a by a predetermined length as described above, so that the second terminal portion 51b and the first terminal portion 51a are respectively exposed to the outside from the proximal end side toward the lower side.

The first elongated protrusion 52a radially protrudes at a predetermined position exposed to the outside of the first terminal portion 51a. The first current-carrying portion 53a having a ring shape is loosely inserted below the first elongated protrusion 52a. A first contact portion 54a formed of an elastic material and connecting the first elongated protrusion 52a and the first current-carrying portion 53a is loosely inserted between the first elongated protrusion 52a and the first current-carrying portion 53a. A negative-side first lead wire 61a connected to the first electromagnet 71a and the second electromagnet 71b is connected to the first current-carrying portion 53a.

Similarly, the second elongated protrusion 52b radially protrudes at a predetermined position exposed to the outside of the second terminal portion 51b. The second current-carrying portion 53b having a ring shape is loosely inserted below the second elongated protrusion 52b. A second contact portion 54b formed of an elastic material and connecting the second elongated protrusion 52b and the second current-carrying portion 53b is loosely inserted between the second elongated protrusion 52b and the second current-carrying portion 53b. A positive-side second lead wire 61b connected to the first electromagnet 71a and the second electromagnet 71b is connected to the second current-carrying portion 53b.

Here, the first contact portion 54a and the second contact portion 54b do not necessarily have to be formed of an elastic material. However, by forming the first contact portion 54a and the second contact portion 54b from an elastic material, they can absorb impact forces when the main shaft portion 40 moves up and down, and prevent the electrode terminal portion 50 from being damaged. With the above configuration, when the main shaft portion 40 rotates around the axis, the electrode terminal portion 50 also rotates integrally. However, the first current-carrying portion 53a and the second current-carrying portion 53b, which are connection destinations of the lead wires 60 to which the first electromagnet 71a and the second electromagnet 71b are connected, are loosely inserted around the first terminal portion 51a and the second terminal portion 51b. Therefore, even if the electrode terminal portion 50 rotates around the axis, the first current-carrying portion 53a and the second current-carrying portion 53b do not rotate integrally. Thus, there is also no risk that the lead wires 60 connected to the first electromagnet 71a and the second electromagnet 71b are twisted or wound around as the main shaft portion 40 rotates, and there is also no risk of lead wires breaking due to the twisting or winding.

On the other hand, electricity supplied from the power source can be reliably supplied to the first electromagnet 71a and the second electromagnet 71b through the first terminal portion 51a and the second terminal portion 51b by the first contact portion 54a and the second contact portion 54b.

[Stopper Portion]

The stopper portion 70 is a columnar electromagnet that generates a magnetic force by energization, and the first electromagnet 71a and the second electromagnet 71b respectively corresponding to the first wheel and tire assembly portion 11a and the second wheel and tire assembly portion 11b are installed in the main body portion 20a and the main body portion 20b.

The first electromagnet 71a is composed of a first teeth 73a formed of a magnetic material and a first winding 74a wound around an outer peripheral portion of the first teeth 73a. Similarly, the second electromagnet 71b is composed of a second teeth 73b and a second winding 74b wound around an outer peripheral portion of the second teeth 73b. Note that the first electromagnet 71a and the second electromagnet 71b do not necessarily have to each have a columnar shape, and may have, for example, a prismatic shape.

As described above, the first base portion 72a that can be loosely fitted into the support groove 23b is attached to the proximal end of the first electromagnet 71a, and the second base portion 72b that can be loosely fitted into the support groove 23a is attached to the proximal end of the second electromagnet 71b. When the power is off and no voltage is applied, the first electromagnet 71a and the second electromagnet 71b are supported by the main body portion 20 with a predetermined distance formed between them and a first stopped portion 14a and a second stopped portion 14b constituting a stopped portion 14 described later.

Furthermore, the first electromagnet 71a and the second electromagnet 71b are connected to the first terminal portion 51a and the second terminal portion 51b via the negative-side first lead wire 61a and the positive-side second lead wire 61b, respectively. When electricity is supplied from the power source and a voltage is applied to the first electromagnet 71a and the second electromagnet 71b, a magnetic field is generated. This magnetic field is generated upward from upper end portions of the first teeth 73a and the second teeth 73b.

[Wheel and Tire Assembly Portion]

The wheel and tire assembly portion 10 is composed of a first wheel and tire assembly portion 11a and a second wheel and tire assembly portion 11b arranged on the left and right sides when viewed from the front, and is rotatably supported by the axle portion 30 with respect to the main body portion 20.

The first wheel and tire assembly portion 11a has a first wheel portion 12a and a first tire portion 13a attached to an outer circumference of the first wheel portion 12a, and on the back surface side of the first wheel portion 12a, a first stopped portion 14a arranged facing the first electromagnet 71a with a predetermined gap formed therebetween is arranged on the entire surface.

The second wheel and tire assembly portion 11b has a second wheel portion 12b and a second tire portion 13b attached to an outer circumference of the second wheel portion 12b, and on the back surface side of the second wheel portion 12b, a second stopped portion 14b arranged facing the second electromagnet 71b with a predetermined gap formed therebetween is arranged on the entire surface.

The first stopped portion 14a and the second stopped portion 14b constituting the stopped portion 14 are each formed of a metal piece. When electricity is supplied from the power source and a voltage is applied to each of the first electromagnet 71a and the second electromagnet 71b to generate a magnetic field, the first electromagnet 71a and the second electromagnet 71b loosely fitted to the main body portion 20 are magnetically attached to the first stopped portion 14a and the second stopped portion 14b, respectively, thereby restricting the rotations of the first wheel and tire assembly portion 11a and the second wheel and tire assembly portion 11b.

Note that the first stopped portion 14a and the second stopped portion 14b do not necessarily have to be each formed of a metal piece, and only need to be formed of a material to which the first electromagnet 71a and the second electromagnet 71b can be respectively magnetically attached when a voltage is applied to the first electromagnet 71a and the second electromagnet 71b.

Further, the first stopped portion 14a and the second stopped portion 14b do not necessarily have to be each arranged on the entire back surface side of the first wheel portion 12a and the second wheel portion 12b. The installation area can be appropriately changed according to the sizes of the first electromagnet 71a and the second electromagnet 71b to be magnetically attached.

The wheel unit 1 configured as described above is attached to a mobile body such as a stretcher, a nursing bed, or a baby carriage. By turning on the power source at hand while moving the mobile body, electricity is supplied from the power source to the stopper portion 70 and a magnetic field is generated by the applied voltage. At this time, the stopper portion 70 is magnetically attached to the stopped portion 14 to restrict the rotation of the wheel and tire assembly portion 10, thereby allowing the mobile body to be stopped safely.

2. Second Embodiment

Next, a wheel unit 1a according to a second embodiment of the present invention will be described with reference to FIG. 4. In the following description, configurations common to the first embodiment are denoted by the same reference numerals, overlapping descriptions will be omitted, and only different configurations will be described in detail.

The wheel unit 1a according to the second embodiment differs from the first embodiment in the configurations of the stopper portion and the stopped portion, and the other configurations are the same. As shown in FIG. 4, a stopper portion 70 of the wheel unit 1a according to the second embodiment is a solenoid electromagnet and has a first solenoid 75a and a second solenoid 75b.

The first solenoid 75a is a push-type solenoid and is composed of a bobbin (not numbered) inside a housing (not numbered), a first winding 76a wound around the bobbin, and a first movable iron core 77a slidably movable along a central axis of the first solenoid 75a. The first movable iron core 77a has a distal end to which a first rod 78a formed of an insulating material and engageable with a first stopped portion 15a described later is connected.

The second solenoid 75b is also a similar push-type solenoid and is composed of a bobbin (not numbered) inside a housing (not numbered), a second winding 76b wound around the bobbin, and a second movable iron core 77b slidably movable along a central axis of the second solenoid 75b. The second movable iron core 77b has a distal end to which a second rod 78b formed of an insulating material and engageable with a second stopped portion 15b described later is connected.

The first movable iron core 77a and the second movable iron core 77b are supported by a first biasing member 79a and a second biasing member 79b biasing the first movable iron core 77a and the second movable iron core 77b in one direction from one end to the other end. When the first solenoid 75a and the second solenoid 75b are not energized, a state in which the first rod 78a and the second rod 78b are stopped at retracted positions where they are withdrawn to the housing side is maintained.

On the other hand, when the first solenoid 75a and the second solenoid 75b are excited by energization, a magnetic force in a direction against the biasing force of each of the first biasing member 79a and the second biasing member 79b is generated. By respectively attracting the first movable iron core 77a toward the inside of the first winding 76a and the second movable iron core 77b toward the inside of the second winding 76b, the first rod 78a and the second rod 78b can be driven in a direction of protrusion from the housing.

Figure 4A:
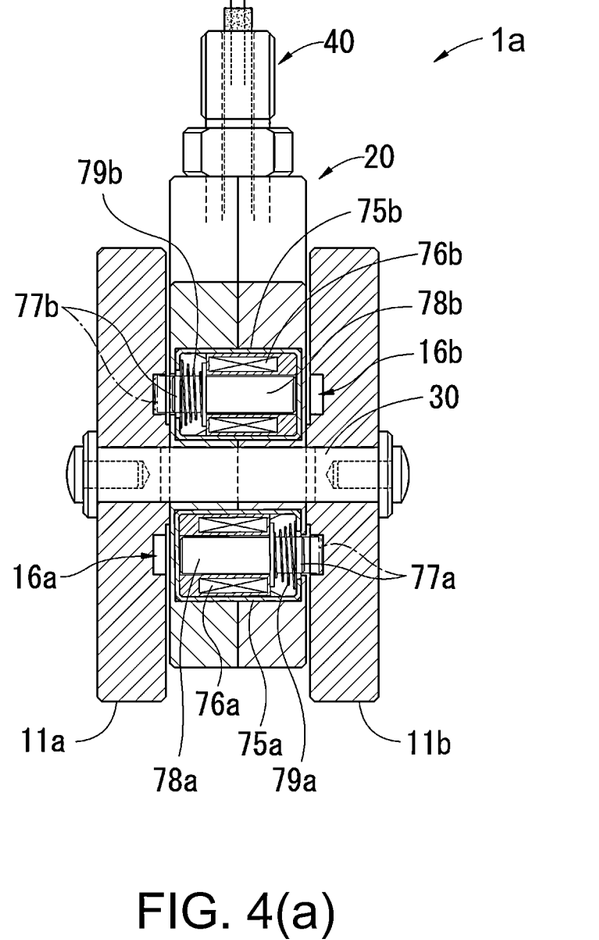
FIG. 4(a) is a front view and FIG. 4(b) is an enlarged view of a stopped portion.
Figure 4B:
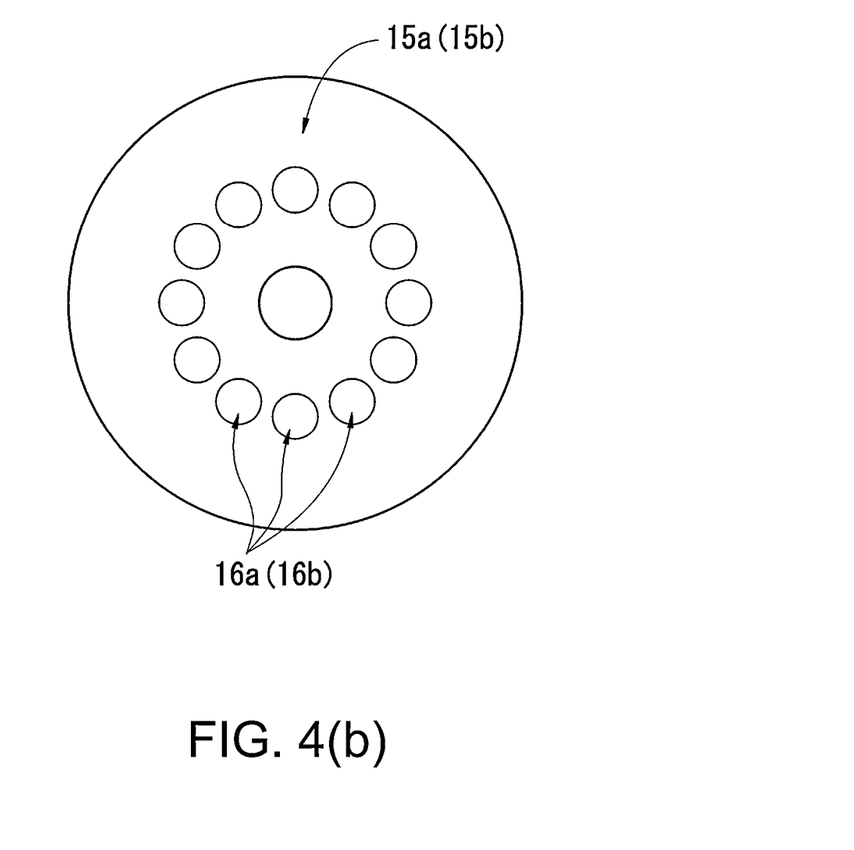

As shown in FIG. 4, the first stopped portion 15a and the second stopped portion 15b constituting a stopped portion 15 are respectively formed with first engagement holes 16a and second engagement holes 16b at equal intervals in the circumferential direction. When the first solenoid 75a and the second solenoid 75b are excited at the time the power source is turned on, the first rod 78a and the second rod 78b are respectively engaged with the first engagement hole 16a and the second engagement hole 16b, and the rotations of the first wheel and tire assembly portion 11a and the second wheel and tire assembly portion 11b are restricted.

The present invention has been described above based on the first embodiment and the second embodiment, but the present invention is not limited to the foregoing embodiments at all, and various improvements and modifications can be made without departing from the gist of the present invention.

For example, the embodiment of the twin wheel type as the wheel unit 1 has been described, but the present invention is also applicable to a single wheel type. The wheel unit 1 according to the present invention can be applied to various types of mobile bodies.

As described above, the wheel unit and the wheel-type mobile body according to the present invention can reliably lock the wheel by a simple operation and prevent unintended movement of the mobile body.

DESCRIPTION OF REFERENCE NUMERALS 1, 1a Wheel unit
10 Wheel and tire assembly portion
11a First wheel and tire assembly portion
11b Second wheel and tire assembly portion
12a First wheel portion
12b Second wheel portion
13a First tire portion
13b Second tire portion
14a, 15a First stopped portion
14b, 15b Second stopped portion
16a First engagement hole
16b Second engagement hole
20, 20a, 20b Main body portion
21a, 21b Axle portion hole
22a, 22b Fitting hole
23a, 23b Support groove
24a, 24b Elongated hole groove
25a, 25b First fitting groove
26a, 26b Second fitting groove
27a, 27b Third fitting groove
28a, 28b Fourth fitting groove
29a, 29b Fifth fitting groove
30 Axle portion
40 Main shaft portion
41 Coupling portion
42 Nut
43 Flange portion
50 Electrode terminal portion
51a First terminal portion
51b Second terminal portion
52a First elongated protrusion
52b Second elongated protrusion
53a First current-carrying portion
53b Second current-carrying portion
54a First contact portion
54b Second contact portion
60 Lead wire
61a First lead wire
61b Second lead wire
70 Stopper portion
71a First electromagnet
71b Second electromagnet
72a First base portion
72b Second base portion
73a First teeth
73b Second teeth
74a, 76a First winding
74b, 76b Second winding
75a First solenoid
75b Second solenoid
77a First movable iron core 77b Second movable iron core
78a First rod
78b Second rod
79a First biasing member
79b Second biasing member

The invention claimed is:

1. A wheel unit comprising:
    a main body portion;
    a main shaft portion having a coupling portion capable of being coupled to an attached body and supported by the main body portion;
    an electrode terminal portion formed of a conductive member and including a first terminal portion composed of a first electrode and a second terminal portion composed of a second electrode;
    a stopper portion connected to the electrode terminal portion via a lead wire and generating a magnetic force by energization; and
    a wheel and tire assembly portion having a wheel portion supported by the main body portion via an axle so as to be rotatable around a horizontal axis, a tire portion attached to an outer circumference of the wheel portion, and a stopped portion arranged facing the stopper portion and against or with which the stopper portion abuts or is engaged when energized to restrict rotation of the wheel portion, wherein
    the main shaft portion has a cylindrical shape supported so as to be rotatable around a vertical axis with respect to the main body portion,
    the first terminal portion and the second terminal portion are rod-shaped bodies longer than the main shaft portion by predetermined length(s), and
    the first terminal portion and the second terminal portion are nested in the main shaft portion, and the main shaft portion, the first terminal portion, and the second terminal portion are connected so as to be integrally rotatable with a common rotation axis.

2. The wheel unit according to claim 1, wherein
    the second terminal portion is nested in the first terminal portion so that a predetermined length of the rod-shaped body of the second terminal portion is exposed from a proximal end of the first terminal portion,
    the first terminal portion is loosely fitted with a ring-shaped first current-carrying portion to which the lead wire is connected, and has a first elongated protrusion radially protruding at a predetermined axial position, and a first contact portion composed of an elastic material and connecting the first current-carrying portion and the first elongated protrusion, and
    the second terminal portion is loosely fitted with a ring-shaped second current-carrying portion to which the lead wire is connected, and has a second elongated protrusion radially protruding at a predetermined axial position, and a second contact portion composed of elastic material and connecting the second current-carrying portion and the second elongated protrusion.

3. The wheel unit according to claim 1, wherein
    the stopper portion is an electromagnet, and
    the stopped portion is a metal piece to which the electromagnet can be magnetically attached when energized.

4. The wheel unit according to claim 1, wherein
    the stopper portion is a solenoid having a movable iron core to which a rod is connected, and
    the stopped portion is an engagement hole formed so that the rod protruding as the movable iron core moves when the solenoid is energized can be engaged therewith.

5. The wheel unit according to claim 1, wherein
    the wheel and tire assembly portion has a pair of wheels rotatably supported at predetermined intervals at both ends of the main body portion,
    the stopper portion is installed on said main body portion, and the stopped portion is installed on each of the pair of the wheels.

6. A wheel-type mobile body comprising the wheel unit according to claim 1.

* * * * *